(12) United States Patent
Iijima

(10) Patent No.: US 7,227,456 B2
(45) Date of Patent: Jun. 5, 2007

(54) TIRE INFORMATION DETECTING DEVICE CAPABLE OF DETECTING CORRECT TIRE INFORMATION

(75) Inventor: Kouta Iijima, Tokyo (JP)

(73) Assignee: Alps Electric Co., Ltd., Tokyo (JP)

( * ) Notice: Subject to any disclaimer, the term of this patent is extended or adjusted under 35 U.S.C. 154(b) by 200 days.

(21) Appl. No.: 11/135,831

(22) Filed: May 23, 2005

(65) Prior Publication Data

US 2005/0264407 A1    Dec. 1, 2005

(30) Foreign Application Priority Data

May 28, 2004  (JP)  ............................. 2004-159689
Jul. 12, 2004  (JP)  ............................. 2004-204638

(51) Int. Cl.
*B60C 23/00* (2006.01)
(52) U.S. Cl. ...................... 340/442; 340/445; 340/447; 340/449
(58) Field of Classification Search .................... None
See application file for complete search history.

(56) References Cited

U.S. PATENT DOCUMENTS 5,699,041 A * 12/1997 Ballyns ...................... 340/442
5,753,809 A * 5/1998 Ogusu et al. ............... 73/146.2
6,278,363 B1 * 8/2001 Bezek et al. ................ 340/442
6,671,609 B2 * 12/2003 Nantz et al. .................. 701/93

FOREIGN PATENT DOCUMENTS

| JP | 08-244424 | 9/1996 |
| JP | 2003-002020 | 1/2003 |

* cited by examiner

*Primary Examiner*—Daniel Wu
*Assistant Examiner*—Son Tang
(74) *Attorney, Agent, or Firm*—Brinks Hofer Gilson & Lione

(57) ABSTRACT

An interrogator is disposed in a main body of a vehicle for transmitting interrogating signals. A responder is mounted to each tire of the vehicle for returning tire information such as air pressure to the interrogator in response to the interrogating signals. The responder is provided with at least one sensor for detecting tire information and a sensor specifying means for specifying properties of the sensor. The interrogator is provided with a control means for processing tire information, and correction tables for correcting properties of a sensor specified by the sensor specifying means. The control means corrects the tire information by the correction tables and then outputs data related to the tire information.

6 Claims, 3 Drawing Sheets

TIRE INFORMATION DETECTING DEVICE CAPABLE OF DETECTING CORRECT TIRE INFORMATION

This application claims the benefit of priority to Japanese Patent Application No. 2004-159689 filed on May 28, 2004 and 2004-204638 filed on Jul. 12, 2004, both herein incorporated by reference.

BACKGROUND OF THE INVENTION

1. Field of the Invention

The present invention relates to a detecting device for detecting tire information such as air pressure or temperature of tires.

2. Description of the Related Art

A conventional tire information detecting device will now be described with reference to FIG. 7. In FIG. 7, a transmitting unit 10 is mounted to each tire of a vehicle to detects the air pressure of a tire and then transmit it as a tire air pressure signal. One receiving units 31 is disposed between front wheels A1 and A2 and another receiving unit 31 is disposed between rear wheels B1 and B2. Each of the receiving unit has a built-in receiving antenna for receiving a signal from the transmitting unit 10. A control unit 4 such as a microcomputer determines whether or not a tire air pressure value output from the transmitting unit 10 is within a normal range. A display unit 5 such as an LCD displays the information determined by the control unit 4.

A sensor for detecting tire air pressure is disposed in the transmitting unit 10. A detected air pressure is converted into a tire air pressure signal, and then a high frequency signal modulated by the air pressure signal is transmitted from the transmitting unit 10. The receiving unit 31 outputs the high frequency signal after demodulating the high frequency signal. The demodulated high frequency signal are read, and displayed as an air pressure value on the display unit 5 (see Japanese Unexamined Patent Application Publication No. 2003-002020 (FIG. 1)).

Here, if each sensor has a variation in its output property of air pressure, a correct air pressure value cannot be displayed. Further, the arrangement of four sensors having uniform output properties increases the cost.

SUMMARY OF THE INVENTION

It is an object of the present invention to detect correct tire information, i.e., air pressure or temperature of tires even if each sensor has a variation in its output property.

In order to solve the problems, according to an aspect of the invention, a detecting device of the present invention includes an interrogator disposed in a main body of a vehicle for transmitting interrogating signals, a responder mounted to each tire of the vehicle for returning tire information such as tire air pressure to the interrogator in response to the interrogating signals. The responder is provided with at least one sensor for detecting the tire information and a sensor specifying means for specifying properties of the sensor. The interrogator is provided with a control means for processing the tire information and correction tables for correcting the properties of the sensor specified by the sensor specifying means. The control means corrects the tire information by the correction tables and outputs data related to the tire information.

Preferably, the sensor has at least a first resonator whose first self-resonant frequency changes in response to changes in the air pressure of the tire.

Preferably, the sensor has at least a second resonator whose second self-resonant frequency changes in response to changes in the temperature of the tire.

Preferably, the sensor specifying means is a third resonator whose third self-resonant frequency is different from the first and second self-resonant frequencies.

Preferably, the interrogator sequentially transmits the interrogating signals whose carriers are respectively modulated by signals near the first to third self-resonant frequencies, and the responder sequentially transmits the response signals whose carriers are respectively modulated by the signals of the first to third self-resonant frequencies to the interrogator.

Preferably, the interrogating signals are comprised of modulated signals in a first half period and non-modulated signals in a second half period. The responder respectively modulates the carriers with the signals of the first to third self-resonant frequencies in the second half period, and emits the modulated carriers.

DESCRIPTION OF THE PREFERRED EMBODIMENTS

Figure 1:
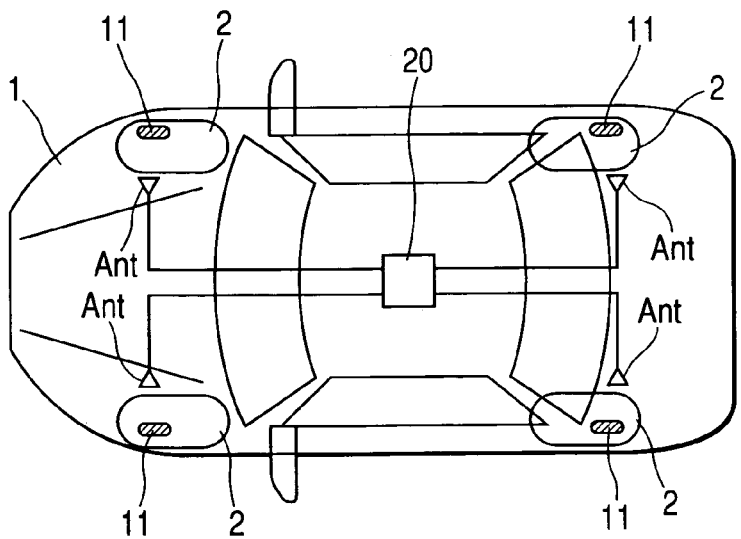
FIG. 1 is a block diagram of a tire information detecting device of the present invention.

A tire information detecting device will be described with reference to the accompanying drawings. FIG. 1 shows the entire construction including a vehicle. Responders 11 having the same construction are respectively provided in tires 2 mounted to a vehicle 1. An interrogator 20 is disposed in a main body of the vehicle 1. Antennas Ant are disposed around the interrogator 20 correspondingly to the respective tires 2 and connected to the interrogator 20.

Figure 2:
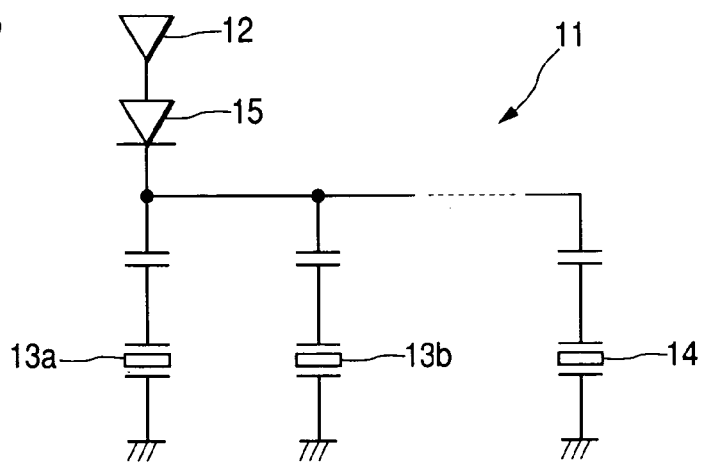
FIG. 2 is a circuit diagram of a responder in the tire information detecting device of the present invention.

FIG. 2 shows a circuit structure of each responder 11. The responder has an antenna 12 for transmitting/receiving. The antenna 12 is combined with a diode 15 for modulating/demodulating, at least one sensor 13 (13a or 13b), and a sensor specifying means 14 for specifying properties of the sensor 13.

The sensor 13 has a self-resonant frequency, and is comprised of a resonator, for example, a quartz resonator whose self-resonant frequency changes in response to changes in air pressure or temperature in the tires 2. Similarly, the sensor specifying means 14 is comprised of a resonator, such as a quartz resonator. Also, for example, a first sensor 13a has a first self-resonant frequency F1, and detects tire air pressure according to changes in the first self-resonant frequency F1 in response to the tire air pressure. Further, a second sensor 13b has a second self-resonant frequency F2, and detects a tire temperature according to changes in the second self-resonant frequency F2 in response to the tire temperature.

Figure 3:
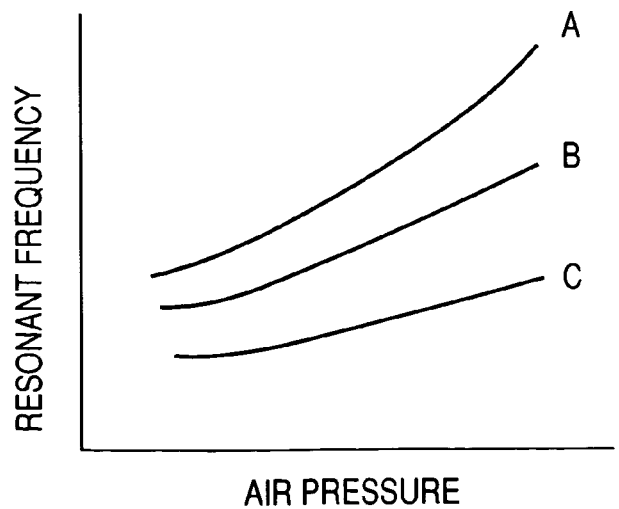
FIG. 3 is a graph showing properties of a sensor used in the tire information detecting device of the present invention.
Figure 4:
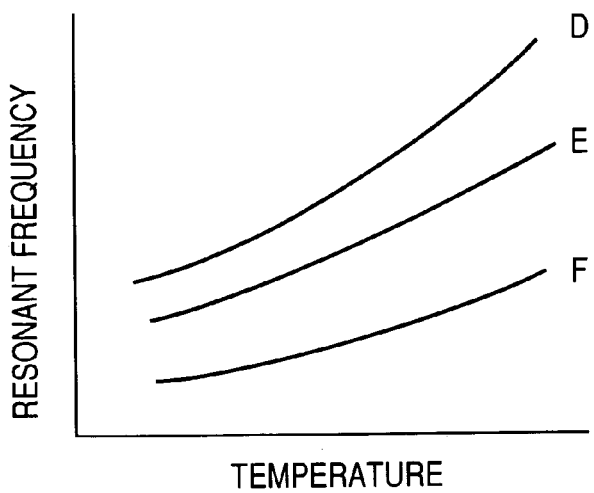
FIG. 4 is a graph showing properties of the sensor used in the tire information detecting device of the present invention.

The changes in the first self-resonant frequency F1 regarding the tire air pressure, for example as shown in FIG. 3, show different properties A to C for each sensor. The changes in the second self-resonant frequency F2 regarding the tire temperature, for example as shown in FIG. 4, show different properties D to F for each sensor.

In addition, the sensor specifying means 14 has a third self-resonant frequency other than the first and second self-resonant frequencies (F1 and F2), for specifying pressure properties (any one of A to C in FIG. 3) of the first sensor and temperature properties (any one of D to F in FIG. 4) of the second sensor. Therefore, specific numerical relations need not be given between the third self-resonant frequency F3 and the first and second self-resonant frequencies F1 and F2. Each of the self-resonant frequencies (F1 to F3) is about 10 MHz.

Figure 5:
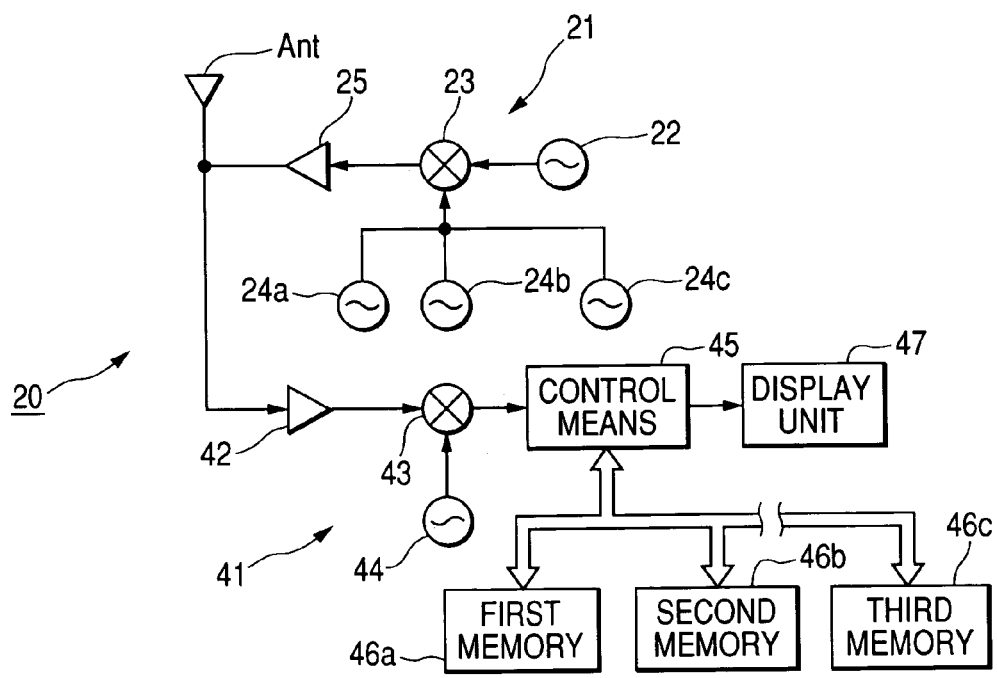
FIG. 5 is a circuit diagram of an interrogator in the tire information detecting device of the present invention.

A circuit structure of the interrogator 20 is shown in FIG. 5. The transmitting part 21 connected to the antenna Ant has a carrier oscillator 22 for generating carriers (Fc) of 2.4 GHz, a modulator 23, an oscillator 24 (a first oscillator 24a to a third oscillator 24c) for outputting oscillating signals for modulating, and a transmitting amplifier 25. The first oscillator 24a oscillates at a frequency (f1) near the first self-resonant frequency F1 of the first sensor 13a, the second oscillator 24b oscillates at a frequency (f2) near the second self-resonant frequency F2 of the second sensor 13b, and the third oscillator 24c oscillates at a frequency (f3) near the third self-resonant frequency F3 of the sensor specifying means 14. An oscillating signal generated by any one of the first oscillator 24a to the third oscillator 24c are switched and input to the modulator 23.

Further, a carrier is amplitude-modulated by the oscillating signal generated from any one of the oscillators 24, then the modulated high frequency signal of 2.4 GHz is amplified by the transmitting amplifier 25, and then the amplified signals are emitted from the antenna Ant.

A receiving part 41 connected to the antenna Ant includes a receiving amplifier 42, a mixer 43, a local oscillator 44, a control means 45 such as a CPU, a plurality of memories 46 (a first memory 46a to a third memory 46c), and a display means 47. The local oscillator 44 outputs a local oscillating signal of the same frequency (2.4 GHz) as that of the carrier oscillator 22, and supplies it to the mixer 43. A plurality of correction tables for respectively correcting a plurality of properties (properties A to C in FIG. 3) of the first sensor 13a is stored in the first memory 46a, a plurality of correction tables for respectively correcting a plurality of properties (properties D to E in FIG. 4) of the second sensor 13b is stored in the second memory 46b. These correction tables are used for calculating correct pressure and temperature of a tire from the self-resonant frequencies (F1 and F2) of the first sensor 13a and the second sensor 13b.

In addition, the third self-resonant frequency F3 of the sensor specifying means 14 and a correspondence table which shows the correspondence relationship between types of the properties of the first and second sensor 13a and 13b specified by the third self-resonant frequency F3 are stored in the third memory 46c.

Figure 6:
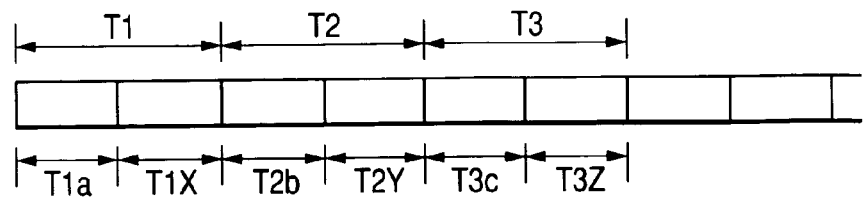
FIG. 6 is a time chart of interrogation signals in the tire information detecting device of the present invention.
Figure 7:
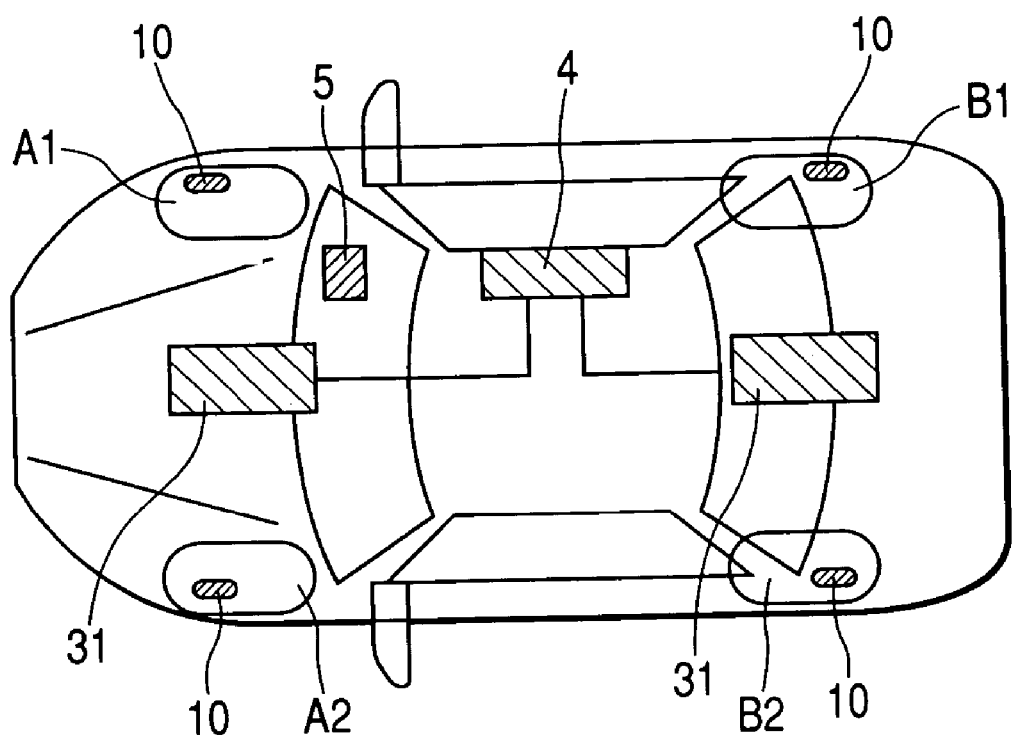
FIG. 7 is a block diagram of a conventional tire information detecting device.

In the above construction, first, the interrogator 20 transmits interrogating signals during a period indicated by T1, T2 and T3 in FIG. 6 to the responder 11 of a specific tire 2. The first halves T1a, T2b and T3c of the period T1 to T3 indicates a transmission period, the second halves T1x, T2y and T3z indicates a receiving period. In the transmission periods T1a, T2b and T3c, a high frequency signal (2.4 GHz) which is amplitude-modulated by oscillating signals from the respective first to third oscillators 24a, 24b and 24c is transmitted. In the second half periods T1x, T2y and T3z, only carriers, which are non-modulated, are transmitted. The transmission process about the responders 11 of the other tires is repeated in the same manner.

Then, in the responder 11, the high frequency signal which is amplitude-modulated is demodulated by the diode 15, and then the same frequency of a signal as that of each oscillating signal is generated. Then, the first sensor 13a is excited by the oscillating signals of the first oscillator because its self-resonant frequency (F1) is near the frequency of the oscillating signal of the first oscillator 24a which is overlapped with the period T1a. Similarly, the second sensor 13b is excited by the oscillating signals of the second oscillator 24b which is overlapped with the period T2b, and the sensor specifying means 14 is excited by oscillating signals of the third oscillator 24c which is overlapped with the period T3c.

The excited first sensor 13a generates signals of the first self-resonant frequency (F1), by which a carrier is amplitude-modulated by the diode 15 during the non-modulating period T1x and the amplitude-modulated carrier is emitted from the antenna 12. Similarly, the second sensor 13b generates signals of the second self-resonant frequency (F2) by which a carrier is amplitude-modulated by the diode 15 during the non-modulating period T2y and the amplitude-modulated carrier is emitted from the antenna 12.

In the interrogator 20, the high frequency signal which is modulated by signals of the first to third self-resonant frequencies (F1 to F3) are input into the mixer 43. At this moment, the high frequency signal is demodulated and signals of the first to third self-resonant frequencies (F1 to F3) are extracted and input into the control means 45. The control means 45 first specifies a correction table corresponding to the first or second sensor 13a or 13b from the correspondence table stored in the third memory 46c. Then, the first self-resonant frequency F1 of the first sensor 13a and the second self-resonant frequency F2 of the second sensor 13b are respectively corrected by the correction tables stored in the first memory 46a and the second memory 46b. Finally, the corrected frequency is converted into data which indicates the air pressure and temperature of a tire, and the data is output to the display unit 47.

As described above, the correction tables are provided according to the properties of the first sensor 13a and the second sensor 13b by which air pressure or temperature of a tire can be correctly displayed irrespective of variation in properties of each sensor.

According to the present invention, the responder is provided with at least one sensor for detecting tire information, and a sensor specifying means for specifying properties of the sensor. The interrogator is provided with a control means for processing tire information, and correction tables for correcting the properties of the sensor specified by the sensor specifying means. The control means corrects the tire information by the correction tables and outputs data related to the tire information. Therefore, correct air pressure and temperature of a tire can be displayed irrespective of a variation in property of each sensor.

According to the present invention, the sensor has at least the first resonator whose first self-resonant frequency changes in response to changes in the air pressure of the tire. Therefore, correct tire air pressure can be detected by changes in the first self-resonant frequency.

According to the present invention, the sensor has at least the second resonator whose second self-resonant frequency changes in response to changes in the temperature of the tire. Therefore, correct tire temperature can be detected by changes in the second self-resonant frequency.

According to the present invention, the sensor specifying means is constructed by a third resonator whose third self-resonant frequency is different from the first and second self-resonant frequency. Therefore, properties of the first and second sensors can be specified without being influenced by the first and second self-resonant frequencies.

According to the present invention, the interrogator sequentially transmits the interrogating signals whose carries are respectively modulated by signals near the first to third self-resonant frequencies to the responder, and excites the first to third resonators, and the responder transmits the response signals whose carriers are respectively modulated by the signals of the first to third self-resonant frequencies to the interrogator. Therefore, the response signals can be returned to the interrogator without providing a power source in the responder.

According to the present invention, the interrogating signals are comprised of modulated signals in a first half period and non-modulated signals in a second half period. The responder respectively modulates the carriers with the signals of the first to third self-resonant frequencies in the second half period, and emits the modulated carrier. Therefore, correct response signals can be returned to the interrogator.

The invention claimed is:

1. A tire information detecting device comprising:
  an interrogator disposed in a main body of a vehicle for transmitting interrogating signals; and
  a responder mounted to each tire of the vehicle for returning tire information including tire air pressure to the interrogator in response to the interrogating signals,
  wherein the responder is provided with at least one sensor for detecting the tire information and a sensor specifying means for specifying properties of the sensor,
  the interrogator is provided with a control means for processing the tire information and correction tables for correcting the properties of the sensor specified by the sensor specifying means, and
  the control means corrects the tire information by the correction tables and outputs data related to the tire information.

2. The tire information detecting device according to claim 1, wherein the sensor has at least a first resonator whose first self-resonant frequency changes in response to changes in the air pressure of the tire.

3. The tire information detecting device according to claim 2, wherein the sensor has at least a second resonator whose second self-resonant frequency changes in response to changes in a temperature of the tire.

4. The tire information detecting device according to claim 3, wherein the sensor specifying means is constructed by a third resonator whose third self-resonant frequency is different from the first and second self-resonant frequencies.

5. The tire information detecting device according to claim 4, wherein the interrogator sequentially transmits the interrogating signals whose carriers are respectively modulated by signals near the first to third self-resonant frequencies to the responder, and excites the first to third resonators, and the responder sequentially transmits the response signals whose carriers are respectively modulated by the signals of the first to third self-resonant frequencies to the interrogator.

6. The tire information detecting device according to claim 5, wherein the interrogating signals are comprised of modulated signals in a first half period and non-modulated signals in a second half period, and the responder respectively modulates the carriers with the signals of the first to third self-resonant frequencies in the second half period, and emits the modulated carriers.

* * * * *